(12) United States Patent
Hagai et al.

(10) Patent No.: US 6,414,972 B1
(45) Date of Patent: Jul. 2, 2002

(54) SIGNAL DECODING METHOD, SIGNAL DECODING APPARATUS, SIGNAL MULTIPLEXING METHOD, SIGNAL MULTIPLEXING APPARATUS, AND RECORDING MEDIUM

(75) Inventors: Makoto Hagai; Takeshi Hatakeyama, both of Osakashi (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/025,816

(22) Filed: Feb. 19, 1998

(30) Foreign Application Priority Data

Feb. 20, 1997 (JP) .............................................. 9-036052

(51) Int. Cl.$^7$ ................................................. H04J 3/04
(52) U.S. Cl. ........................ 370/532; 370/535; 370/536
(58) Field of Search ................................. 370/355, 310, 370/394, 532, 535, 536, 538, 540, 542; 348/415, 384, 390, 423, 419, 409, 416, 420

(56) References Cited

U.S. PATENT DOCUMENTS

| | | | | |
|---|---|---|---|---|
| 5,122,875 A | * | 6/1992 | Raychaudhuri et al. ...... | 348/390 |
| 5,751,445 A | * | 5/1998 | Masunaga ..................... | 358/426 |
| 5,760,820 A | * | 6/1998 | Eda et al. ...................... | 348/9 |
| 5,781,561 A | * | 7/1998 | Machida et al. ............. | 714/752 |
| 6,081,551 A | * | 6/2000 | Etoh ............................. | 375/240 |
| 6,084,909 A | * | 7/2000 | Chiang et al. ............... | 375/240 |
| 6,091,768 A | * | 7/2000 | Bru .............................. | 375/240 |
| 6,097,759 A | * | 8/2000 | Murakami et al. ........... | 375/240 |

* cited by examiner

Primary Examiner—Wellington Chin
Assistant Examiner—Brenda H. Pham
(74) Attorney, Agent, or Firm—Parkhurst & Wendel, LLP

(57) ABSTRACT

A signal decoding method comprises the steps of: receiving multiplexed signals in which coded signals of plural pieces of information to be recorded or transmitted have been multiplexed; obtaining priority information of respective information from the multiplexed signals; and decoding coded signals of respective information included in the multiplexed signals in the order in accordance with the obtained priority information.

19 Claims, 9 Drawing Sheets

SIGNAL DECODING METHOD, SIGNAL DECODING APPARATUS, SIGNAL MULTIPLEXING METHOD, SIGNAL MULTIPLEXING APPARATUS, AND RECORDING MEDIUM

FIELD OF THE INVENTION

The present invention relates to a signal decoding method, a signal decoding apparatus, a signal multiplexing method, a signal multiplexing apparatus, and a recording medium and, more particularly to an apparatus and a method of implementing decoding and multiplexing in which amount of signals to be decoded can be reduced with effects on a regenerated image effectively suppressed, and an apparatus and a method in which multiplexed signals are decoded properly.

The present invention also relates to a recording medium which stores the multiplexed signals and a recording medium which stores a program for implementing the decoding and the multiplexing in a computer.

BACKGROUND OF THE INVENTION

In order to record and transmit large volumes of image data with efficiency, techniques for compressing the image data are extremely important. So far, as the techniques, information compressive techniques according to standards such as JPEG (Joint Photographic Coding Experts Group), MPEG(Moving Picture Experts Group), and so forth have been developed. Image data of an image or a moving picture series is handled in MPEG and JPEG.

There is an image termed "a composite image". The "composite image" comprises plural small images (object images). FIG. 8 is a diagram showing a concept of this composite image.

Referring now to FIG. 8, a final composite image 707 comprises a background image 701, and images 702 to 705 of objects A and B located in front of the background image 701. Note that a background image of a composite image is also an image of an object.

Specifically, the background image 701 and the image 702 of the object A are composited to generate a composite image 706. At this time, a transparency signal indicating a composition ratio of a pixel value of the background image 701 to a pixel value of the image 702, is used. The image 703 is an image represented by the transparency signal of the object A, which indicates transparency of the image of the object A.

Further, the composite image 706 and the image 704 are composited on the basis of a transparency signal of the object B as mentioned above, to generate the composite image 707. An image 705 is an image of the object B represented by the transparency signal of the object B, which indicates transparency of the image of the object B.

In a case where a moving picture is a composite image, a background image and an image of each object thereof are respectively assumed to be a moving picture series. Therefore, images of frames of each moving picture series are composited, to generate a composite moving picture comprising plural moving picture series.

FIG. 9 is a block diagram showing a prior art image multiplexing apparatus which codes and multiplexes image signals of a composite image and an image decoding apparatus which decodes multiplexed coded signals of the composite image.

Referring now to FIG. 9, an image multiplexing apparatus 801 is used for coding and multiplexing image signals (digital image data) of respective objects of the composite image, and an image decoding apparatus 802 is used for receiving and decoding multiplexed signals MEg output from the image multiplexing apparatus 801.

More specifically, the image multiplexing apparatus 801 comprises plural coding means 40a1 to 40an for coding image signals Sg1 to Sgn of plural objects of the composite image, to produce coded signals Eg1 to Egn, respectively, and multiplexing means 412 for multiplexing the coded signals Eg1 to Egn to produce multiplexed coded signals MEg.

In the image multiplexing apparatus 801 so constructed, when the image signals Sg1 to Sgn are input, the coding means 40a1 to 40an code the image signals Sg1 to Sgn, respectively, and outputs the coded signals Eg1 to Egn to the multiplexing means 412, which multiplexes the coded signals Eg1 to Egn and outputs the multiplexed signals MEg to a transmission path 803.

Meanwhile, the image decoding apparatus 802 comprises demultiplexing means 102 for demultiplexing the multiplexed signals MEg to separate the coded signals Eg1 to Egn from the multiplexed signals MEg, a decoding unit 101 for sequentially decoding the coded signals Eg1 to Egn in accordance with a control signal C1, synthesizing means 110 for receiving decoded signals Dg of respective objects output from the decoding unit 101 and synthesizing the decoded signals Dg in accordance with a control signals C2 to produce synthesized reproduced signals Rs, and a CPU 108 for producing the control signals C1 and C2.

The decoding unit 101 comprises a select switch 103 for selecting the separated coded signals Eg1 to Egn in the order in accordance with the control signal C1, and decoding means 109 for decoding a selected output Se of the select switch 103 to produce the decoded signal Dg. The CPU 108 has a capability of controlling switching of the select switch 103 by the control signal C1, and instructing the synthesizing means 110 on a synthesizing method by the control signal C2.

In the image decoding apparatus 802 so constructed, when the multiplexed signals MEg output from the image multiplexing apparatus 801 are input through the transmission path 803, the multiplexed signals MEg are demultiplexed by the demultiplexing means 102 to produce the coded signals Eg1 to Egn.

At this time, the CPU 108 produces the control signals C1 and C2. The select switch 103 selects one of the coded signals Eg1 to Egn in accordance with the control signal C1 and outputs the selected signal Se to the decoding means 109, which decodes the selected signal Se and outputs the decoded signal Dg to the synthesizing means 110, which synthesizes the decoded signals Dg in accordance with the control signal C2 and, outputs the synthesized reproduced signals Rs.

A case of processing the composite moving picture comprising plural small images using these apparatus will be described. When image signals of moving picture series of respective objects are input to the image multiplexing apparatus 801, the coding means 40a1 to 40an code the image signals, respectively, and the multiplexing means 412 multiplexes these coded signals and outputs the multiplexed signals MEg to the image decoding apparatus 802. In the image decoding apparatus 802, the demultiplexing means 102 separates the coded signals Eg1 to Egn of respective objects of the moving picture series from the multiplexed signals MEg, the decoding unit 101 decodes these coded signals, and the synthesizing means 110 synthesizes the decoded signals Dg and outputs the synthesized reproduced signals Rs of the composite moving picture comprising the moving picture.

Note that in the image multiplexing apparatus 801, information required for compositing images, such as compositing order, size, and compositing positions of images of respective objects is also multiplexed and transmitted during multiplexing the coded signals.

However, since the composite image comprises plural images, load on decoding is increased as compared with a case where an image is decoded. For this reason, in decoding in software using a general purpose computer, the size and number of images to be decoded within a given time are limited depending on capability of the CPU. In addition, in a case where the composite image comprises a moving picture, although coded signals of a prescribed amount must be decoded within a given time, if the decoding is not completed within the given time, display delay or overflow of an input buffer occurs.

As should be appreciated from the forgoing, it is important that decoding be controlled depending on capability of a decoding apparatus when the coded signals of the composite image are decoded. However, in the prior art, it is difficult to control the decoding, since insufficient capability of the decoding apparatus is not taken into account.

SUMMARY OF THE INVENTION

It is an object of the present invention to provide a method and an apparatus of multiplexing images in which decoding is performed depending on capability of a decoding apparatus, and a method and an apparatus of decoding an image in which amount of signals to be decoded can be reduced depending on decoding capability with adverse effects on regenerated images suppressed.

It is another object of the present invention to provide a recording medium which stores multiplexed signals of data structure allowing decoding depending on capability of the decoding apparatus and, a recording medium which stores a program for implementing signal processing with the image multiplexing method and the image decoding method in a computer.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, a signal decoding method comprising the steps of: receiving multiplexed signals in which coded signals of plural pieces of information to be recorded or transmitted have been multiplexed; obtaining priority information of respective information from the multiplexed signals, and decoding coded signals of respective information included in the multiplexed signals in the order in accordance with the obtained priority information.

Therefore, even if signal processing capability of a decoding apparatus is not sufficient for decoding all the multiplexed coded signals, decoding can be adaptively controlled so as to minimize adverse effects on regenerated images.

According to a second aspect of the present invention, a signal decoding comprises the steps of: receiving multiplexed signals in which coded signals of plural pieces of information to be recorded or transmitted have been multiplexed; obtaining priority information of respective information from the multiplexed signals; deciding the order in which the coded signals are decoded in accordance with the obtained priority information; and decoding only coded signals of a higher decoding order than a prescribed order, of the coded signals of plural pieces of information included in the multiplexed signals.

Therefore, if signal processing capability of a decoding apparatus is not sufficient for decoding all the multiplexed coded signals, only coded signals of significant information can be decoded.

According to a third aspect of the present invention, a signal decoding method comprises the steps of: receiving multiplexed signals in which hierarchically coded signals comprising coded signals in plural hierarchies of plural pieces of information to be recorded or transmitted have been multiplexed; obtaining priority information of respective information from the multiplexed signals; deciding the order in which the hierarchically coded signals are decoded in accordance with the obtained priority information; and decoding only hierarchically coded signals in hierarchies from the lowest order to a higher order than a prescribed order, of a higher decoding order than a prescribed order, of the hierarchically coded signals of plural pieces of information included in the multiplexed signals.

Therefore, even if signal processing capability of a decoding apparatus is not sufficient for decoding hierarchically coded signals of all objects included in the multiplexed signals, decoding can be adaptively controlled so as to minimize adverse effects on regenerated images According to a fourth aspect of the present invention, the signal decoding method of the first aspect further comprises the steps of: detecting amounts of the coded signals of respective information included in the multiplexed signals; and deciding the priority information such that the priority decreases in decreasing order of amounts of coded signals.

Therefore, if processing capability of a decoding apparatus is not sufficient for decoding the multiplexed signals, amount of signals to be decoded can be reduced while minimizing adverse effects on regenerated images.

According to a fifth aspect of the present invention, in the signal decoding method of the first aspect, respective information to be recorded or transmitted comprises digital image data as digital data with which an image is displayed, and the multiplexed signals comprise a coded image signal in which the digital image data has been coded, as the coded signals.

Therefore, even if signal processing capability of a decoding apparatus is not sufficient for decoding all the multiplexed coded signals, decoding can be adaptively controlled so as to minimize adverse effects on regenerated images.

According to a sixth aspect of the present invention, the signal decoding method of the fifth aspect further comprises the steps of: detecting size of regenerated images in which the coded image signals of the multiplexed signals have been decoded; and deciding the priority information such that the priority of the digital image data decreases in decreasing order of size of the regenerated images.

Therefore, if processing capability of a decoding apparatus is not sufficient for decoding the multiplexed signals, amount of signals to be decoded can be reduced while minimizing adverse effects on regenerated images.

According to a seventh aspect of the present invention, the signal decoding method of the fifth aspect further comprises the steps of: detecting overlapping order in which regenerated images in which the coded image signals of the multiplexed signals have been decoded are composited; and deciding the priority information such that a higher priority is assigned to digital image data of a regenerated image located in front in relation to the other regenerated images, in a composite image comprising the overlapped regenerated images.

Therefore, if processing capability of a decoding apparatus is not sufficient for decoding the multiplexed signals, amount of signals to be decoded can be reduced while minimizing adverse effects on regenerated images.

According to an eighth aspect of the present invention, the signal decoding method of the fifth aspect further comprises the steps of: deciding whether a regenerated image in which a coded image signal of the multiplexed signals has been decoded is used as a reference image for decoding another coded image signal or not; and deciding the priority information such that a higher priority is assigned to digital image data of a regenerated image which is used as the reference image for the decoding, in relation to the other digital image data of regenerated images which are not used as the reference image for the decoding.

Therefore, even if signal processing capability of a decoding apparatus is not sufficient for decoding all the multiplexed coded signals, amount of signals to be decoded can be reduced, while preferentially decoding a coded signal of a reference image required for predictive coding.

According to a ninth aspect of the present invention, the signal decoding method of the fifth aspect further comprises the steps of: deciding whether the coded image signal of the digital image data is an intra frame coded image signal or not; and deciding the priority information such that a higher priority is assigned to digital image data of the intra frame coded image signal in relation to the other digital image data in which coded image signals are not intra frame coded image signals.

Therefore, even if signal processing capability of a decoding apparatus is not sufficient for decoding all the multiplexed coded signals, amount of signals to be decoded can be reduced, while preferentially decoding a coded signal which plays an important role in high-speed retrieval.

According to a tenth aspect of the present invention, a signal decoding apparatus which decodes multiplexed signals in which coded signals of plural pieces of information to be recorded or transmitted, have been multiplexed, comprises: demultiplexing means for separating coded signals of respective information from the multiplexed signals; priority producing means for producing priority information of respective information on the basis of the multiplexed signals; decoding means for decoding the coded signals output from the demultiplexing means in a prescribed order in accordance with a control signal; and control means for controlling the order in which coded signals are decoded by the decoding means, by the control signal on the basis of the priority information.

Therefore, even if signal processing capability of a decoding apparatus is not sufficient for decoding all the multiplexed coded signals, decoding can be adaptively controlled so as to minimize adverse effects on regenerated images.

According to an eleventh aspect of the present invention, a signal multiplexing method comprising the steps of: coding plural pieces of information to be recorded or transmitted, to produce coded signals; producing priority information of respective information with which decoding order of the coded signals is decided, on the basis of the coded signals; and multiplexing the coded signals together with the priority information.

Therefore, it is not necessary for an image decoding apparatus to set priorities of respective information, whereby burden of signal processing on the image decoding apparatus can reduced.

According to a twelfth aspect of the present invention, in the signal multiplexing method of the eleventh aspect, the priority information of respective information is decided such that the priority decreases in decreasing order of amounts of coded signals of respective information.

Therefore, if processing capability of a decoding apparatus is not sufficient for decoding the multiplexed signals, amount of signals to be decoded can be reduced while minimizing adverse effects on regenerated images.

According to a thirteenth aspect of the present invention, in the signal multiplexing method of the eleventh aspect, respective information to be recorded or transmitted comprises digital image data as digital data with which an image is displayed, and the multiplexed signals comprise a coded image signal in which the digital image data has been coded, as the coded signals.

Therefore, even if signal processing capability of a decoding apparatus is not sufficient for decoding all the multiplexed coded signals, decoding can be adaptively controlled, while minimizing adverse effects on regenerated images.

According to a fourteenth aspect of the present invention, in the signal multiplexing method of the thirteenth aspect, the priority information of each digital image data is decided on the basis of size of regenerated images in which coded image signals of the multiplexed signals have been decoded, and decided such that the priority of digital image data decreases in decreasing order of size of the regenerated images.

Therefore, if processing capability of a decoding apparatus is not sufficient for decoding the input multiplexed signals, amount of signals to be decoded can be reduced while minimizing adverse effects on regenerated images.

According to a fifteenth aspect of the present invention, in the signal multiplexing method of the thirteenth aspect, the priority information of each digital image data indicates the overlapping order in which regenerated images in which coded image signals of the multiplexed signals have been decoded are composited, and the priority information is decided such that a higher priority is assigned to digital image data of a regenerated image located in front in relation to the other regenerated images, in a composite image comprising the overlapped regenerated images.

Therefore, if processing capability of a decoding apparatus is not sufficient for decoding the input multiplexed signals, amount of signals to be decoded can be reduced while minimizing adverse effects on regenerated images.

According to a sixteenth aspect of the present invention, in the signal multiplexing method of the thirteenth aspect, the priority information of each digital image data is decided based on whether a regenerated image in which a coded image signal of the multiplexed signals has been decoded is used as a reference image for decoding another coded image signal or not, and decided such that a higher priority is assigned to digital image data of a regenerated image which is used as the reference image for the decoding, in relation to the other regenerated images which are not used as the reference image for the decoding.

Therefore, even if signal processing capability of a decoding apparatus is not sufficient for decoding the input multiplexed coded signals, amount of signals to be decoded can be reduced, while preferentially decoding a coded signal of a reference image required for predictive coding.

According to a seventeenth aspect of the present invention, in the signal multiplexing method of the thirteenth aspect, the priority information of the digital image data is decided based on whether a coded image signal of each digital image data of the multiplexed signals is an intra-frame coded signal or not, and decided such that a higher priority is assigned to digital image data of the intra frame coded signal, in relation to the other digital image data in which coded image signals are not intra frame coded image signals.

Therefore, even if signal processing capability of a decoding apparatus is not sufficient for decoding the input multiplexed signals, amount of coded signals to be decoded can be reduced, while preferenlially decoding a coded signal which plays an important role in high-speed retrieval.

According to an eighteenth aspect of the present invention, a signal multiplexing apparatus which multiplexes coded signals of plural pieces of information to be recorded or transmitted, comprises priority producing means for producing priority information of respective information with which decoding order of the coded signals is decided; and multiplexing means for multiplexing the coded signals together with the priority information.

Therefore, it is not necessary for an image decoding apparatus to set priorities of respective information, whereby burden of signal processing on the image decoding apparatus can reduced.

According to a nineteenth aspect of the present invention, a recording medium is used for storing multiplexed signals in which coded signals of plural pieces of information to be recorded or transmitted have been multiplexed together with priority information of respective information with which decoding order of the coded signals is decided.

Therefore, in the decoding apparatus which decodes the multiplexed signals, even if signal processing capability of a decoding apparatus is not sufficient for decoding all the multiplexed coded signals, decoding can be adaptively controlled, while minimizing adverse effects on regenerated images.

According to a twentieth aspect of the present invention, a recording medium is used for storing a program which makes a computer perform signal decoding, the program making the computer perform signal decoding by the signal decoding method of the first aspect.

Therefore, even if signal processing capability of a decoding apparatus is not sufficient for decoding all the multiplexed coded signals, adaptively controlled decoding while minimizing adverse effects on regenerated images is realized in the computer.

According to a twenty-first aspect of the present invention, a recording medium is used for storing a program which makes a computer perform signal multiplexing, the program making the computer perform signal multiplexing by the signal multiplexing method of the eleventh aspect.

Therefore, it is not necessary for a signal decoding apparatus to set priorities of respective information, whereby signal multiplexing in which processing burden on the signal decoding apparatus is reduced, is realized in the computer

BRIEF DESCRIPTION OF THE DRAWINGS

FIGS. 4(a) and 4(b) are diagrams showing an image multiplexing apparatus according to a second embodiment of the present invention, wherein FIG. 4(a) shows a structure of the image multiplexing apparatus and FIG. 4(b) shows data structure of multiplexed signals output from the image multiplexing apparatus.

DETAILED DESCRIPTION OF THE PREFERRED EMBODIMENT

Preferred embodiments of the present invention will now be described.

Embodiment 1.

Figure 1:
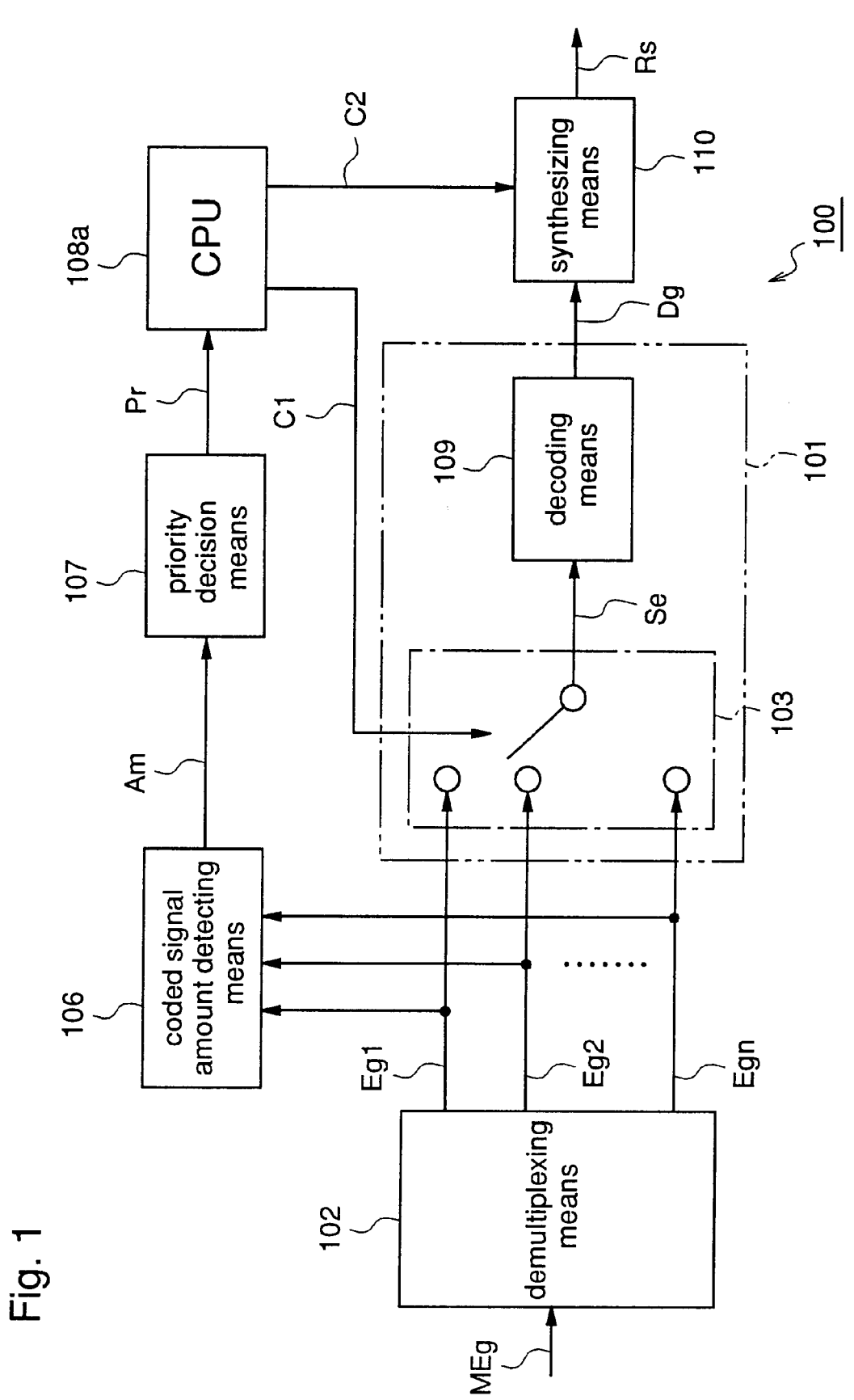
FIG. 1 is a block diagram showing an image decoding apparatus according to a first embodiment of the present invention.

FIG. 1 is a block diagram showing an image decoding apparatus of the present invention. First, a construction of the image decoding apparatus of the present invention is described with reference to FIG. 1.

Figure 9:
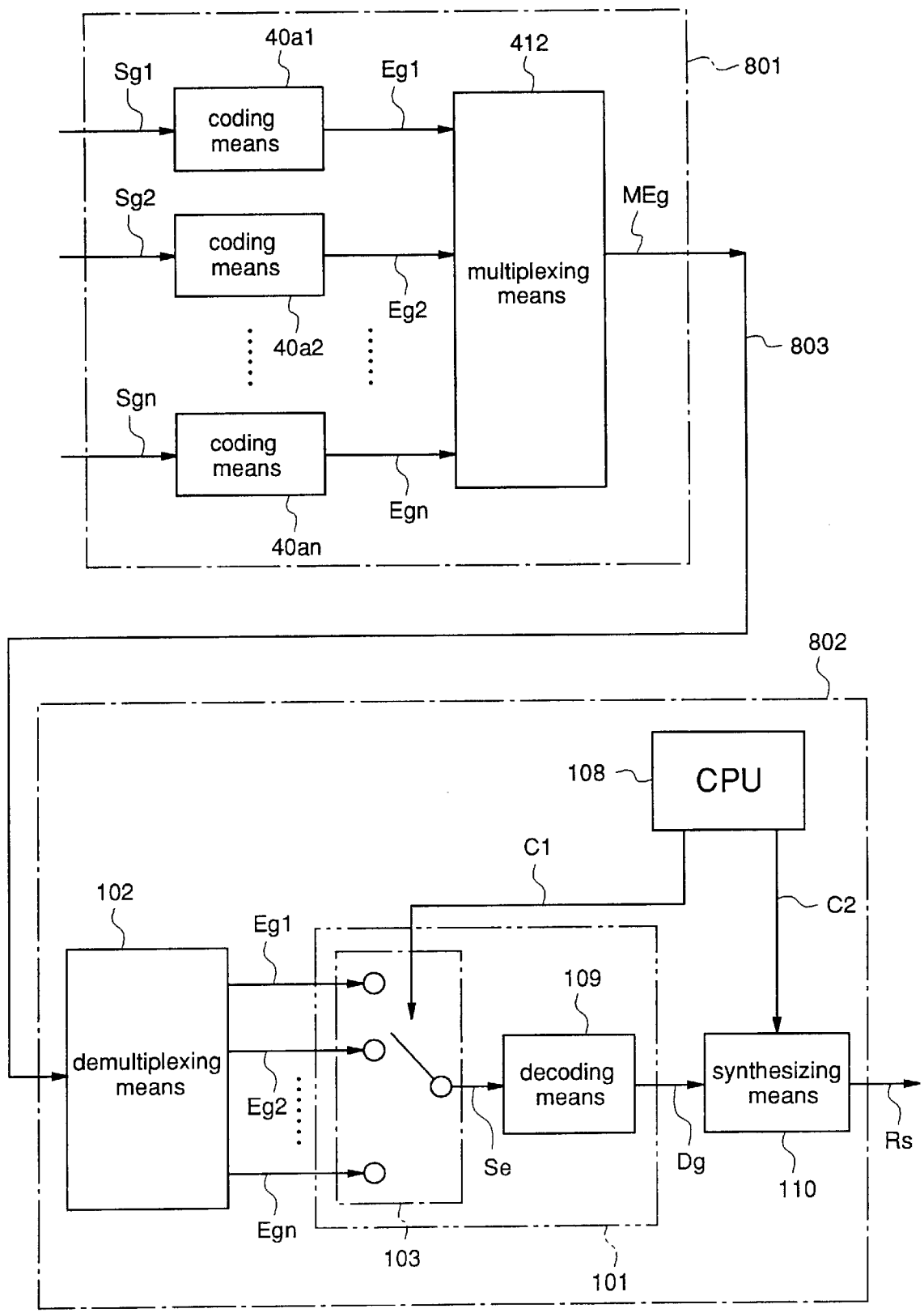
FIG. 9 is a block diagram showing prior art image multiplexing apparatus and image decoding apparatus.

Referring to FIG. 1, an image decoding apparatus 100 is used for receiving multiplexed signals MEg and decoding coded signals Eg1 to Egn of respective objects of a composite image, included in the multiplexed signals MEg as described in the prior art image decoding apparatus 802 in FIG. 9. Specifically, the image decoding apparatus 100 comprises demultiplexing means 102 for separating the coded signals Eg1 to Egn from the multiplexed signals MEg, a decoding unit 101 for sequentially decoding the coded signals Eg1 to Egn in accordance with a control signal C1, and synthesizing means 110 for synthesizing decoded signals Dg of respective objects output from the decoding unit 101 in accordance with a control signals C2. The decoding unit 101 comprises a select switch 103 for selecting one of the coded signals Eg1 to Egn output from the demultiplexing means 102 in accordance with the control signal C1, and decoding means 109 for decoding an output Se of the select switch 103.

The image decoding apparatus 100 further comprises coded signal amount detecting means 106 for detecting amounts of the coded signals Eg1 to Egn, and priority decision means 107 for making comparison among the coded signals Eg1 to Egn to decide priorities of respective objects of the composite image, and outputting priority information Pr of respective objects.

In the image decoding apparatus 100, the CPU 108 of the prior art image decoding apparatus 802 is replaced with a CPU 108a for controlling the decoding unit 101 and the synthesizing means 110 by the control signals C1 and C2, respectively, on the basis of the priority information Pr. More specifically, the CPU 108a has a capability of informing the decoding unit 101 of the decoding order on the basis of the priority information Pr from the priority decision means 107 and controlling operation of the synthesizing means 110. The control signal C2 is used for informing the synthesizing means 110 of information such as positions, sizes, overlapping order, and so forth of images of respective objects of the composite moving picture.

Next, the operation will be described with reference to the same picture.

When the multiplexed signals MEg are input to the image decoding apparatus 100, the demultiplexing means 102 separates the coded signals Eg1 to Egn from the multiplexed signals MEg, and outputs the coded signals Eg1 to Egn to the decoding unit 101 and the coded signal amount detecting means 106.

The coded signal amount detecting means 106 detects amounts of respective coded signals Eg1 to Egn and outputs a signal Am indicating amount of each coded signal to the priority decision means 107.

The priority decision means 107 decides priorities of respective objects on the basis of the amounts of coded signals. This is described in detail with reference to FIG. 2.

Generally, in the case of a moving picture comprising small amount of a coded signal, size of an image is small or the image changes little, and therefore skipping decoding of the image over plural frames has little adverse effects on vision. On the other hand, in the case of a moving picture comprising large amount of a coded signal, size of an image is large or the image changes significantly, and therefore the skipping has great adverse effects on vision. Accordingly, a method of deciding decoding priorities of respective objects on the basis of amounts of the coded signals is effective.

Figure 2:
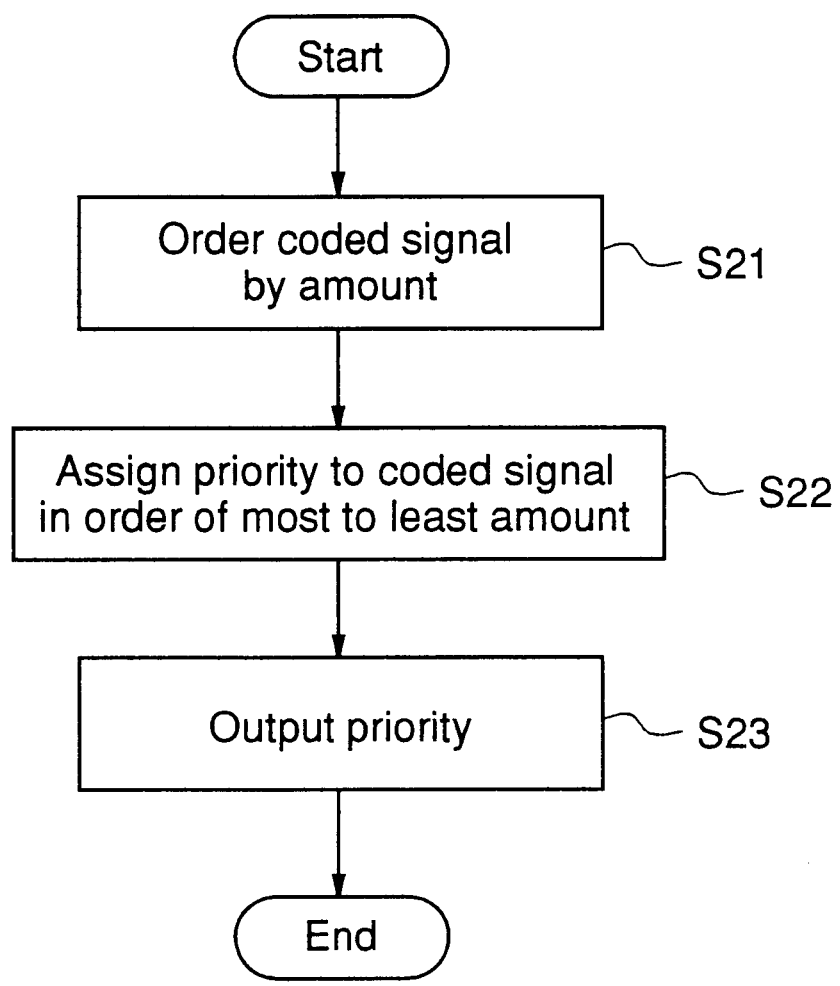
FIG. 2 is a flowchart showing priority decision of the image decoding apparatus of the first embodiment.

FIG. 2 is a flowchart showing signal processing of the priority decision means 107. Referring to FIG. 2, in step S21, plural coded signals Eg1 to Egn are ordered by their amounts. In step 22, priorities are assigned to respective objects such that coded signals are processed in decreasing order of their amounts. In step S23, the priorities are output as the priority information Pr to the CPU 108a.

The CPU 108a controls decoding and synthesizing on the basis of the priorities. Specifically, the decoding unit 101 decodes the coded signals Eg1 to Egn in accordance with the control signal C1 from the CPU 108a, and the synthesizing means 110 synthesizes the decoded signals Dg of the coded signals Eg1 to Egn in accordance with the control signal C2 and outputs synthesized reproduced signals Rs for generating a composite image. Signal processing of the CPU 108a will be described with reference to FIG. 3.

Figure 3:
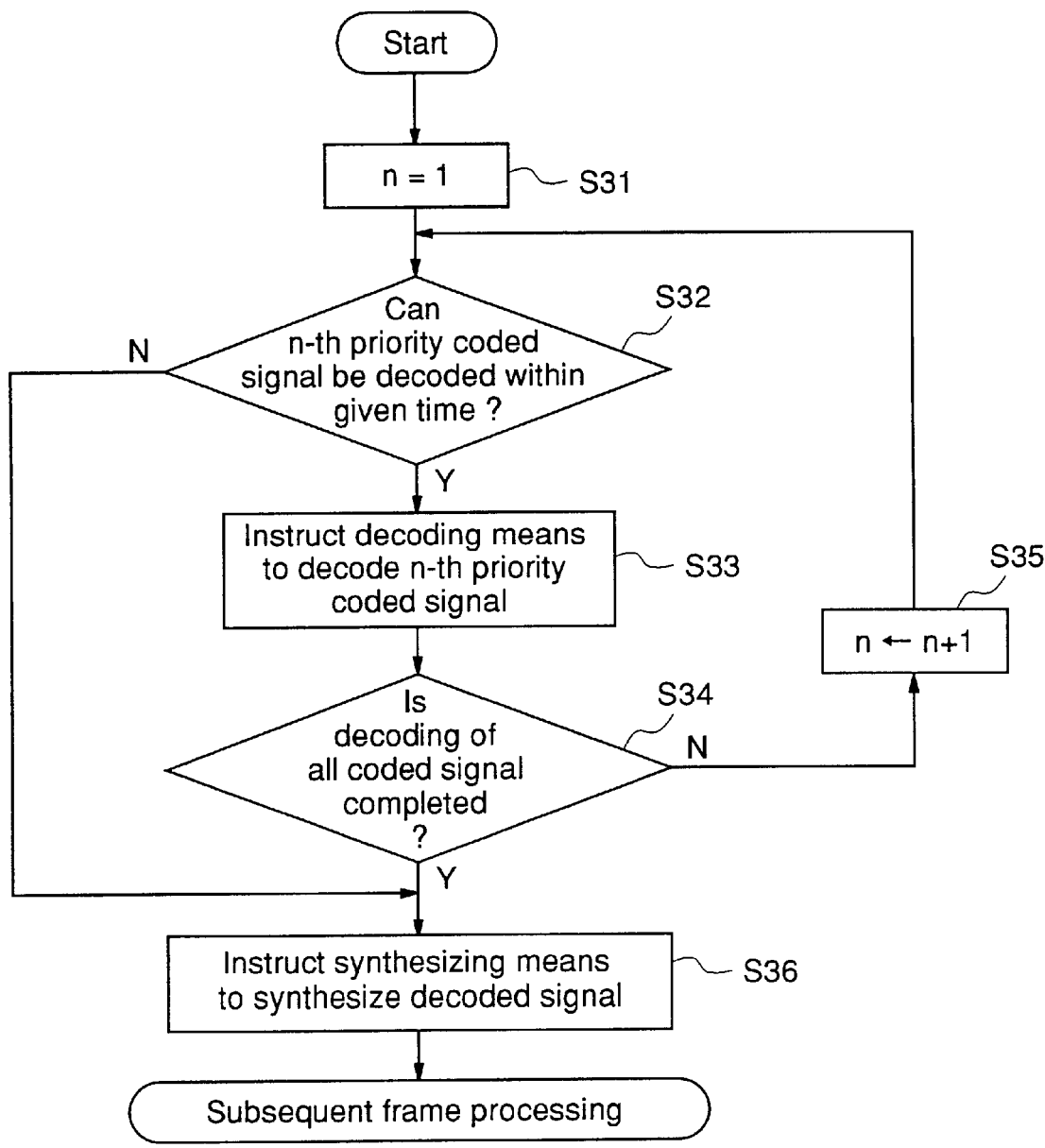
FIG. 3 is a flowchart showing processing of CPU of the image decoding apparatus of the first embodiment.

FIG. 3 is a flowchart showing signal processing of the CPU 108a. Referring to FIG. 3, in step 31, to start processing of a coded signal of the highest priority object, a value "n" of a priority counter is initialized. In step S32, it is decided whether the coded signal of the highest priority object can be decoded within a given time or not. When decided that the coded signal cannot be decoded, the CPU 108a performs step S36, whereas when decided the coded signal can be decoded, in step 33, the CPU 108a instructs the decoding unit 101 to decode the coded signal.

Subsequently in step 34, it is decided whether the coded signals Eg1 to Egn have been decoded by the decoding unit 101 or not. When decided all the coded signals Eg1 to Egn have not been decoded, in step 35, the CPU 108a increments the "n" of the priority counter by one, and then performs the previous step S32 so that a coded signal of an object of the second highest priority is decoded.

On the other hand, when decided all the coded signals Eg1 to Egn have been decoded in step S34, in step S36, the CPU 108a instructs the synthesizing means 110 to synthesize decoded signals of respective objects.

These decoding and synthesizing are sequentially performed for each frame of the composite moving picture. For objects in which coded signals have not been decoded in the steps S31 to S35, decoded signals used in synthesizing of a previous frame may be used.

Thus, in accordance with the first embodiment, the image decoding apparatus 100 comprises coded signal amount detecting means 106 for detecting amounts of the coded signals Eg1 to Egn of respective objects, included in the multiplexed signals MEg, and priority decision means 107 for deciding priorities of respective objects of a composite image on the basis of their amounts, to decode the coded signals Eg1 to Egn in the decoding order on the basis of the priorities. Therefore, even when the CPU 108a does not have sufficient capability to decode all the coded signals Eg1 to Egn, amount of signals to be decoded is reduced wile minimizing adverse effects on a regenerated image.

Although in the first embodiment the image decoding apparatus 100 in which the CPU 108a instructs the decoding unit 101 to decode coded signals in accordance with priorities has been described, the image decoding apparatus is not limited thereto. For example, the CPU 108a may decide that coded signals of first to n-th (n; positive integer) priority objects can be decoded within a given time, and then may instruct the decoding unit 101 to decode the coded signals in an arbitrary order.

In addition, although in the first embodiment priorities are assigned to all the coded signals, a method of deciding priorities is not limited thereto.

For example, in a decoding method according to MPEG, predictive decoding is performed to image signals, In this predictive decoding, a coded signal is decoded by referring to a decoded signal as a reference image signal.

However, in the case of skipping decoding of a coded signal of an object over plural frames in this predictive decoding, in some frames, a reference image signal for the coded signal is not decoded. Therefore, in these frames, assuming that the coded signal of the undedcoded reference signal is not decoded, a priority may not be assigned to the object.

In addition, although in the first embodiment the coded signals are all first decoded and then synthesized, synthesizing may be performed concurrently with decoding.

Furthermore, although in the first embodiment the priority decision means 107 decides priorities on the basis of amounts of coded signals, a method of deciding the priorities is not limited thereto, and other alternative methods are as follows.

a)In the case of an object of small size among objects of the composite image, even if decoding of the object is skipped over plural frames, this has little effect on the composite image. Therefore, the coded signal amount detecting means 106 may be replaced with means for detecting an image size of an object of each coded signal (number of pixels in the object or a size of an area of an object), wherein priorities are established among objects in such a manner that the priority decreases in decreasing order of size of the objects.

b)In the case of an object located at the center of the composite image, since it has a significant effect on vision, the coded signal amount detecting means 106 may be replaced with means for detecting a position of an object of each coded signal (center of gravity of an object or a position of an area of an object), wherein priorities are established among objects in such a manner that a higher priority is assigned to an object which is closer to the center of the composite image than the other objects.

c) In the case of overlapping order, since an object located in front has a significant effect on vision, the coded signal amount detecting means 106 may be replaced with means for detecting overlapping order, wherein priorities are established among objects in such a manner that a higher priority is assigned to an object to be located in front in relation to the other objects.

d) In the case of an object of higher transparency among objects of the composite image, even if decoding of a coded signal of the object is skipped over plural frames, this has little effect on the composite image. Therefore, the coded signal amount detecting means 106 may be replaced with means for detecting a representative value of transparency of each object, for example, an average value of transparency, wherein priorities are established among objects in such a manner that the priority decreases in increasing order of height of transparency.

e) In the case of coding of image signals of a moving picture, in some cases, image signals of respective objects are coded at different frame rates. In this case, when a long time interval has elapsed between a decoding timing and a subsequent decoding timing of an image signal, the image signal has significant effects on a regenerated image if decoding is skipped over plural frames. Therefore, the coded signal amount detecting means 106 may be replaced with means for detecting a time interval between a decoding timing and a subsequent decoding timing, wherein priorities are established among objects in such a manner that the priority decreases in decreasing order of length of elapsed time interval.

f) In the case of an object which moves fast, even if decoding of the object is skipped over plural frames, this has little effect on a composite image comprising the object, since resolution of the object is low to the human visual sense. Therefore, the coded signal amount detecting means 106 may be replaced with means for detecting representative of motion (speed) component of each object on the basis of the corresponding coded signal, wherein priorities are established among objects in such a manner that a lower priority is assigned to an object which moves faster than the other objects. When it is impossible to decode an object, it is possible that decoded images of a previous decoding timing are composited to generate a dummy composite image, in which case, composition using motion component (a previously decoded image is translated in parallel by a distance corresponding to motion component to generate a composite image) is performed, thereby the dummy composite image looks real.

g) In the case of predictive decoding according to MPEG, it is desired that a decoded image signal of a previous frame be held as a reference image. Therefore, the coded signal amount detecting means 106 may be replaced with means for deciding whether a coded signal to be decoded is a coded signal which is decoded by referring to a decoded image or not, wherein priorities are established among objects in such a manner that a higher priority is assigned to an object of the coded signal which is decoded by referring to the decoded image, for example, P picture in MPEG, in relation to the other objects in which coded signals are decoded without referring to the decoded image.

h) Further, there may be provided means for deciding whether a decoded image in which a coded signal of the multiplexed signals has been decoded is used as a reference image for decoding another coded signal or not, wherein priorities are established among objects in such a manner that a higher priority is assigned to an object comprising the decoded image used as the reference image, in relation to the other objects comprising decoded images which are not used as the reference image.

i) In the case of predictive decoding according to MPEG, since an intra frame coded signal, for example, I picture, is decoded independently, that is, without an image signal of another frame, it plays an important role in high speed retrieval or the like. Therefore, the coded signal amount detecting means 106 may be replaced with means for deciding whether a coded signal of each object is an intra frame coded signal or not, wherein priorities are established among objects in such a manner that a higher priority is assigned to an object to which intra frame coding has been performed, in relation to the other objects to which intra frame coding has not been performed.

Furthermore, the various priority decision methods may be used in combination to decide priorities. In an example of use of two methods in combination, priorities of respective objects are classified by amounts of their coded signals and, then to objects in the same class, priorities are further assigned according to image size of each object.

In this case, by using evaluation function in which evaluation reference for use in each priority decision method is assumed to be a variable, priorities may be decided on the basis of evaluation values of the evaluation function.

More specifically, in the case of using first and second priority decision methods, assuming that evaluation references for use in the first and second methods are a variable (coded signal amount) x and a variable (image size) y, respectively, the evaluation function "f" is represented by $Z=f(x, y)$, where z is an evaluation value of the evaluation function, i.e., a priority.

Furthermore, although in the first embodiment, the image decoding apparatus is provided with one decoding means, it may be provided with plural decoding means.

Furthermore, although in the first embodiment, the image decoding apparatus is used for receiving the multiplexed signals in which coded signals have been multiplexed as input signals, they may be multiplexed signals comprising coded signals of digital data such as text data, design data (computer graphics (CG) data with which lines or graphics are drawn), and so forth, other than the image data. In case of text data, information such as font or character size is also transmitted, to be composited on a composite image as in the object images.

Furthermore, although in the first embodiment, an object is an image and a coded signals of image data is decoded, in a case where an object is sound such as voice or music, a coded signal of sound data can be decoded as described in the case of the image data of the first embodiment. In the case of sound, priorities are decided on the basis of amount of coded sound data, volume, or the like.

Embodiment 2.

Figure 4:
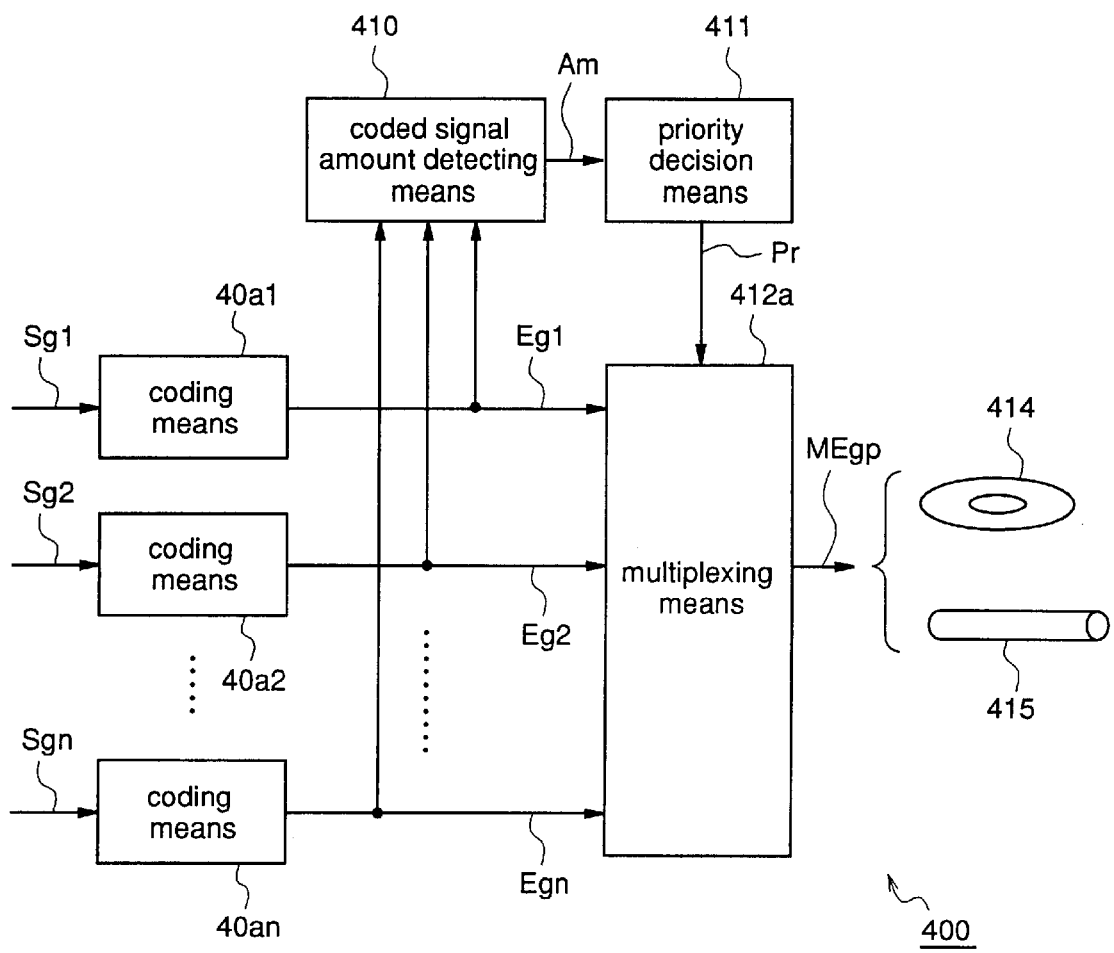
Figure 4:
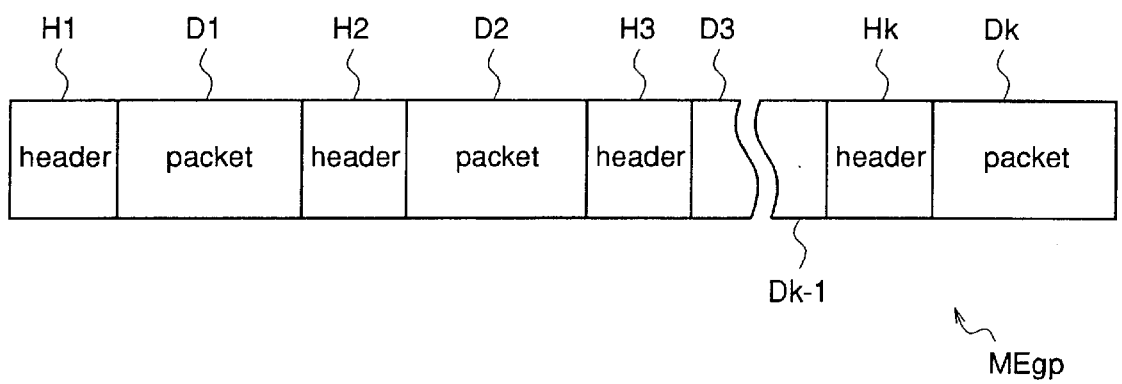

FIGS. 4(*a*) and 4(*b*) are diagrams showing an image multiplexing apparatus according to a second embodiment of the present invention, wherein FIG. 4(*a*) is a block diagram showing the image multiplexing apparatus and FIG. 4(*b*) shows data structure of multiplexed signals output from the image multiplexing apparatus.

Referring to FIG. 4(*a*), an image multiplexing apparatus 400 is used for coding image signals of respective objects of a composite image to produce coded signals, producing priority information of respective objects, and multiplexing the priority information and the coded signals and transmitting resulting priority information and coded signals which have been multiplexed.

Specifically, the image multiplexing apparatus 400 comprises plural coding means 40*a*1 to 40*an* for coding image signals Sg1 to Sgn to produce coded signals Eg1 to Egn, respectively, as in the prior art image multiplexing apparatus 801 in FIG. 9.

The image multiplexing apparatus 400 further comprises coded signal amount detecting means 410 for detecting amounts of the coded signals Eg1 to Egn, and priority decision means 411 for deciding priorities of respective objects of the composite image. Constructions of the coded signal amount detecting means 410 and the priority decision means 411 are identical to those of the coded signal amount detecting means 106 and the priority decision means 107 of the image decoding apparatus 100 of the first embodiment. The image signals Sg1 to Sgn are of respective objects of the composite image, one of which corresponds to a background image.

In the image multiplexing apparatus 400, the multiplexing means 412 of the prior art image multiplexing apparatus 801 is replaced with multiplexing means 412a for multiplexing the priority information Pr output from the priority decision means 411 and the coded signals Eg1 to Egn, to produce multiplexed signals MEgp.

The multiplexed signals MEgp are recorded in a recording medium 414, or transmitted to an image decoding apparatus 500 of a third embodiment mentioned later through a transmission medium 415.

FIG. 4(b) shows data structure of the multiplexed signals MEgp. Referring to FIG. 4(b), the multiplexed signals MEgp comprises plural packeted data (packet data) D1 to Dk, and the corresponding headers H1 to Hk. The coded signals Eg1 to Egn are divided for each prescribed data amount, and included in the multiplexed signals MEgp as the packet data D1 to DE, and priority information Pr of respective objects is included in the headers H1 to Hk of the corresponding coded signals.

Operation of the image multiplexing apparatus 400 will now be described. Operations of the coded signal amount detecting means 410 and the priority decision means 411 are identical to those of the coded signal amount detecting means 106 and the priority decision means 107 of the image decoding apparatus 100, and therefore will be described in brief herein.

When the image signals Sg1 to Sgn of respective objects are input to the image multiplexing apparatus 400, the coding means 40a1 to 40an code the image signals Sg1 to Sgn, respectively, and outputs the coded signals Eg1 to Egn to the multiplexing means 412a and the coded signal amount detecting means 410. The coded signal amount detecting means 410 detests amounts of the coded signals Eg1 to Egn and outputs amount information Am to the priority decision means 411. The priority decision means 411 decides priorities of respective objects as in the first embodiment and outputs the priority information Pr of respective objects to the multiplexing means 412a.

The multiplexing means 412a multiplexes the coded signals Eg1 to Egn and the priority information Pr and outputs the multiplexed signals MEgp.

To retain an image as a composite moving picture for each program or per sequence, the multiplexed signals MEgp are recorded in the recording medium 414, while to transmit the multiplexed signals MEgp to an image decoding apparatus, they are output to the transmission medium 415.

Thus, in accordance with the second embodiment, the image multiplexing apparatus 400 comprises coded signal amount detecting means 410 for detecting amounts of the coded signals Eg1 to Egn of the multiplexed signals MEgp, and priority decision means 411 for deciding priorities of respective coded signals by their amounts, to produce the priority information of respective objects of the composite image, multiplex and output the priority information and the coded signals. Therefore, burden of signal processing on the image decoding apparatus in receiving side can be reduced.

Although in the second embodiment, the image multiplexing apparatus 400 comprises the priority decision means 411 for deciding priorities of coded signals by their amounts, the image multiplexing apparatus is not limited thereto. The priority decision means 411 may employ alternative decision methods as already described in the first embodiment. These will be described in brief.

a) The coded signal amount detecting means 410 may be replaced with means for detecting image size of an object on the basis of the coded signal, wherein priorities are established among objects of a composite image in such a manner that the priority decreases in decreasing order of image size of the objects.

b) The coded signal amount detecting means 410 may be replaced with means for detecting positions of respective objects on the basis of the coded signals , wherein priorities are established among objects of a composite image in such a manner that a higher priority is assigned to an object which is closer to the center of the composite image than the other objects.

c) The coded signal amount detecting means 410 may be replaced with means for detecting overlapping order on the basis of the coded signals, wherein priorities are established among objects of a composite image in such a manner that a higher priority is assigned to an object to be positioned in front in relation to the other objects.

d) The coded signal amount detecting means 410 may be replaced with means for detecting a representative value of transparency of each object, wherein priorities are established among objects of a composite image in such a manner that the priority decreases in increasing order of height of transparency .

e) The coded signal amount detecting means 410 may be replaced with means for detecting a time interval between a decoding timing and a subsequent decoding timing, wherein priorities are established among objects of a composite image in such a manner that priority decreases in decreasing order of length of elapsed time interval.

f) The coded signal amount detecting means 410 may be replaced with means for detecting representative of motion (speed) component of each object on the basis of the corresponding coded signal, wherein priorities are established among objects of a composite image in such a manner that a lower priority is assigned to an object which moves faster than the other objects.

g) The coded signal amount detecting means 410 may be replaced with means for deciding whether a coded signal to be decoded is a coded signal which is decoded by referring to a reference image or not, wherein priorities are established among objects of a composite image in such a manner that a higher priority is assigned to an object of the coded signal which is decoded by referring to the reference image, in relation to the other objects in which coded signals are decoded without referring to the reference image.

h) The coded signal amount detecting means 410 may be replaced with means for deciding whether a decoded image in which a coded signal of multiplexed signals has been decoded is used as a reference image for decoding another coded signal or not, wherein priorities are established among objects of a composite image in such a manner that a higher priority is assigned to an object comprising the decoded image used as the reference image, in relation to the other objects comprising decoded images which are not used as the reference image.

i) The coded signal amount detecting means 410 may be replaced with means for deciding whether a coded signal of each object is an intra frame coded signal or not, wherein priorities are established among objects of a composite image in such a manner that a higher priority is assigned to an object to which intra frame coding has been performed, in relation to the other objects to which intra frame coding has not been performed.

Furthermore, the various priority decision methods may be used in combination to decide priorities. In an example of use of two methods in combination, priorities of respective objects are classified by amounts of their coded signals and, then to objects in the same class, priorities are further assigned according to image size of each object. In addition, in an example of use of plural methods in combination, on assumption that evaluation references for use in respective methods are variables, evaluation function of these variables is created, to decide priorities on the basis of evaluation values of the evaluation function.

Furthermore, although in the second embodiment, the image multiplexing apparatus is provided with plural coding means, it may be provided with one coding means which is supplied with image signals of plural objects.

Furthermore, although in the second embodiment, the image multiplexing apparatus is used for multiplexing the coded signals of image data of respective objects, and outputting the multiplexed signals, they may be multiplexed signals comprising coded signals of text data, design data (computer graphics (CG) data with which lines or graphics are drawn), and so forth, other than the image data. In case of text data, information such as font or character size is also transmitted, to be composited on a composite image as in the object image.

Furthermore, although in the second embodiment, an object is an image and a coded signals of image data is decoded, in a case where an object is sound such as voice or music, a coded signal of sound data can be decoded as described in the case of the image data of the second embodiment. In the case of sound, priorities are decided on the basis of amount of coded sound data, volume, or the like.

Embodiment 3.

Figure 5:
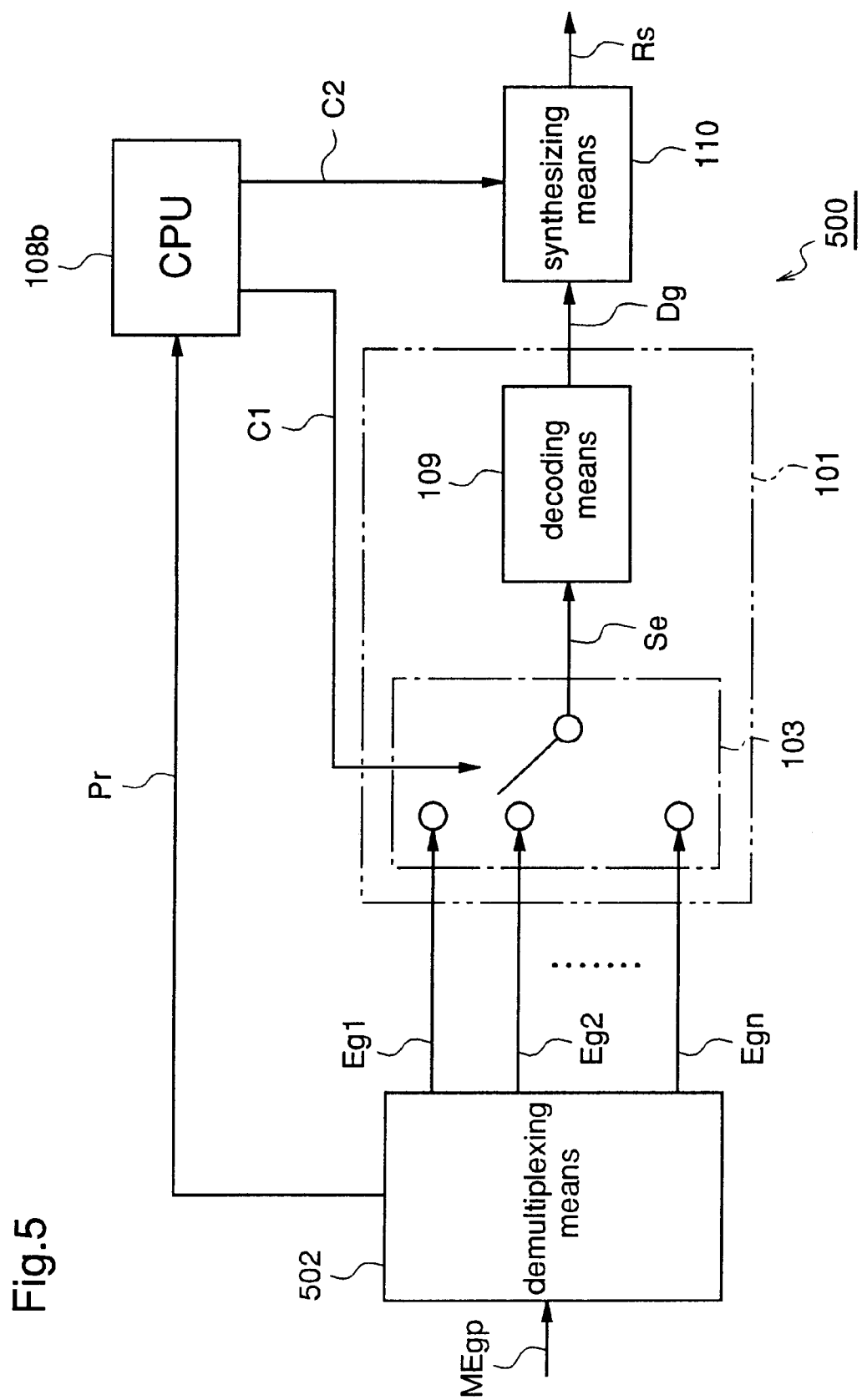
FIG. 5 is a block diagram showing an image decoding apparatus according to a third embodiment of the present invention.

FIG. 5 is a block diagram showing an image decoding apparatus according to a third embodiment of the present invention.

Referring to FIG. 5, an image decoding apparatus 500 is used for decoding multiplexed signals MEgp output from the image multiplexing apparatus 400 of the second embodiment.

Specifically, in the image decoding apparatus 500, the demultiplexing means 102 of the image decoding apparatus 802 in FIG. 9 is replaced with demultiplexing means 502 for demultiplexing the multiplexed signals MEgp and separating coded signals Eg1 to Egn and priority information Pr of respective objects from the multiplexed signals MEgp. As in the image decoding apparatus 802 in FIG. 9, the image decoding apparatus 500 comprises, decoding unit 101 for sequentially decoding the coded signals Eg1 to Egn in accordance with a control signal C1, and synthesizing means 110 for receiving decoded signals Dg output from the decoding unit 101 and synthesizing the decoded signals Dg in accordance with a control signal C2 to produce synthesized reproduced signals Rs.

As in the prior art image decoding apparatus 802, the decoding unit 101 comprises a select switch 103 for selecting one of the coded signals Eg1 to Egn in accordance with the control signal C1, and decoding means 109 for decoding a selected output Se of the select switch 103.

Furthermore, in the image decoding apparatus 500, the CPU 108 of the image decoding apparatus 802 is replaced with a CPU 108b for producing the control signals C1 and C2 on the basis of the priority information Pr.

Operation of the image decoding apparatus 500 will now be described with reference to the same Figure.

Operation similar to that of the image decoding apparatus 100 of the first embodiment will be described in brief.

When the multiplexed signals MEgp are input to the image decoding apparatus 500, the demultiplexing means 502 separates the coded signals Eg1 to Egn and the priority information Pr from the multiplexed signals MEgp and outputs the coded signals Eg1 to Egn and the priority information Pr.

The CPU 108b receives the prior information Pr, decides the decoding order of the coded signals Eg1 to Egn as in the image decoding apparatus 100 of the first embodiment, and informs the decoding unit 101 of the decoding order by the control signal C1. In the decoding unit 101, the select switch 103 is controlled so that it selects the coded signals Eg1 to Egn output from the demultiplexing means 502 in the decoding order in accordance with the control signal C1, and outputs a selected out Se to the decoding means 109.

The decoding means 109 decodes the output Se of the select switch 103 and outputs the decoded signal Dg to the synthesizing means 110. In brief, the decoding unit 101 decodes coded signals of respective objects in the order specified by the CPU 108b.

The decoded signals Dg are synthesized by the synthesizing means 110, which outputs synthesized reproduced signals Rs with which a composite image comprising objects is displayed.

Thus, in accordance with the third embodiment, the image decoding apparatus 500 comprises demultiplexing means 502 for separating the coded signals Eg1 to Egn and the priority information Pr of respective objects from the multiplexed signals MEgp, to decode the coded signals Eg1 to Egn in the decoding order on the basis of the priorities. Therefore, in the image decoding apparatus 500, the priority information is obtained from the input multiplexed signals. As a result, a component for deciding the priority information is dispensed with, whereby decoding capability of the image decoding apparatus is improved.

If capability of the image decoding apparatus is not sufficient for decoding all the coded signals, decoding can be controlled so as to minimize adverse effect on an image in accordance with the priority information.

Although in the third embodiment, the CPU 108b instructs the decoding unit 101 to decode coded signals in the order on the basis of the priority information of respective objects, construction of the image decoding apparatus is not limited thereto. For example, the CPU 108b first decides that coded signals of objects of first to n-th (n: positive integer) priorities can be decoded within a given time, and then instructs the decoding unit 101 to decode the coded signals in an arbitrary order of the first to n-th priorities.

Furthermore, although in the third embodiment, the image decoding apparatus 500 is used for receiving multiplexed signals in which coded signals of image data of a composite image have been multiplexed as input signals, they may be multiplexed signals comprising coded signals of text data, design data (computer graphics (CG) data with which lines or graphics are drawn), and so forth, other than the image data. In case of text data, information such as font or character size is also transmitted, to be composited on a composite image as in the object images.

Furthermore, although in the third embodiment, an object is an image and a coded signals of image data is decoded, in a case where an object is sound such as voice or music, a coded signal of sound data can be decoded as described in the case of the image data of the third embodiment. In the case of sound, priorities are decided on the basis of amount of coded sound data, volume, or the like.

Embodiment 4.

Figure 6:
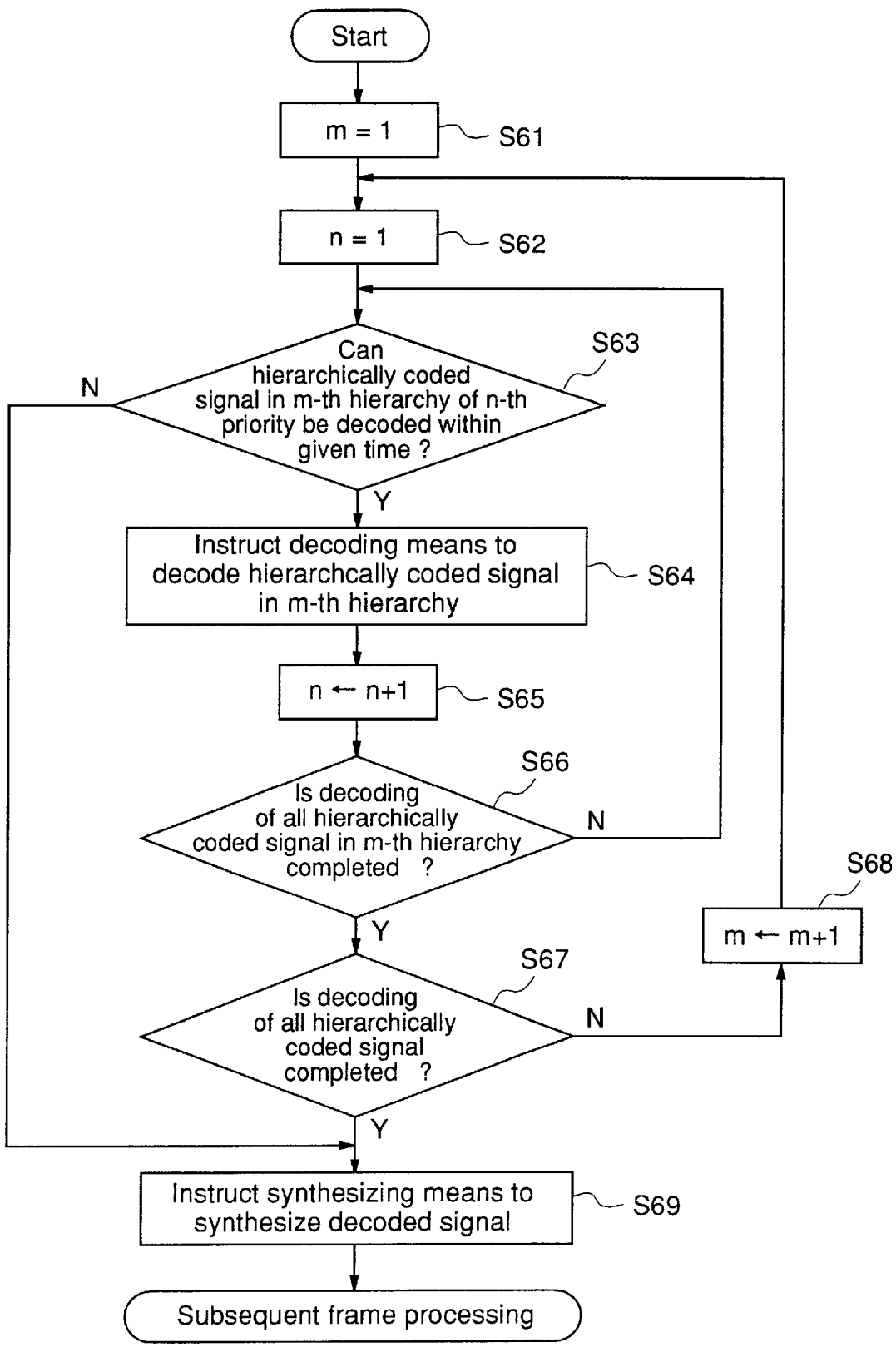
FIG. 6 is a flowchart showing processing of CPU of an image decoding apparatus according to a fourth embodiment of the present invention.

FIG. 6 is a diagram showing an image decoding apparatus according to a fourth embodiment of the present invention and shows decoding multiplexed signals in which hierarchically coded signals in which image signals of respective objects of a composite image are hierarchically coded, are multiplexed.

In this hierarchical coding, a low-resolution image signal and a high-resolution image signal of an object are respectively coded to produce coded signals of respective resolutions.

Thus hierarchically coded signals comprises plural coded signals of image signals of different resolutions.

Therefore, a coded signal of a low-resolution image signal of small coded or decoded signal amount is used to allow high speed retrieval or transmission of images of respective objects. In addition, a high-resolution image signal is coded by referring to the low-resolution image signal as a reference image signal, thereby the high-resolution signal can be coded with high efficiency. In the hierarchical coding, a low-resolution image may be termed "an image in a basic hierarchy or a low-order hierarchy" and a high-resolution image may be termed "an image in a high-order hierarchy".

In the hierarchical coding, images of different SN (signal-to-noise ratio) or of different frame rates are used other than images of different spatial resolutions.

A basic construction of an image decoding apparatus of the fourth embodiment is identical to that of the image decoding apparatus 500 in FIG. 5 of the third embodiment, and differs only in that hierarchically coded signals in which image signals have been hierarchically coded are decoded in the fourth embodiment. That is, in the image decoding apparatus of the fourth embodiment, constructions of components except CPU and a decoding unit are identical to those of the image decoding apparatus 500 of the third embodiment. Therefore, in this embodiment, signal processing of CPU is mainly described with reference to FIG. 6.

FIG. 6 is a f low chart showing the signal processing of the CPU. Assume that "m" indicates an m-th hierarchical order starting from the lowest order hierarchy (basic hierarchy) and "n" indicates an n-th priority assigned to an object.

In step S61, the CPU initializes the "m" of a hierarchical counter to 1 to perform processing a coded signal in a basic hierarchy. In step S62, the CPU initializes the "n" to 1.

In step S63, the CPU decides whether a hierarchically coded signal in m-th hierarchy of n-th priority object can be decoded within a given time or not. When decided it cannot be decoded in step S63, in step S69, the CPU instructs synthesizing means to synthesize decoded image signals, whereas when decided it can be decoded in step 63, in step 64, the CPU instructs decoding means to decode the hierarchically coded signal in the m-th hierarchy of the n-th priority object.

In step S65, the CPU increments the "n" by one, and then in step S66, the CPU decides whether coded signals in the m-th hierarchy have been decoded for objects of all priorities or not. When decided the decoding is not completed, the CPU performs step S63 again. The CPU repeats steps S63 to S65 until the decoding is completed.

In step S67, the CPU decides whether hierarchically coded signals of objects of a composite image of one frame have been decoded or not. When decided the decoding is not completed in step 67, the CPU increments the "m" of the hierarchical counter by one in step 68. Then, the CPU performs steps S62 to S67 again. On the other hand, when decided that the decoding is completed in step S67, the CPU instructs the synthesizing means to synthesize decoded image signals by the control signal C2 in step S69.

Thus, in accordance with the fourth embodiment, when hierarchically coded signals of plural objects of the composite image are decoded, the CPU decides whether coded signals of all objects in a prescribed hierarchy can be decoded within a given time or not, and when decided the decoding is not completed within the given time, the coded signals in the hierarchy are not decoded. Therefore, even if decoding capability is not sufficient for decoding hierarchically coded signals of all objects of the composite image, amount of decoded signals is controlled while minimizing adverse effects on the composite image.

Although in the fourth embodiment the image decoding apparatus for decoding the hierarchically coded signals has construction identical to that of the image decoding apparatus 500 of the third embodiment, the image decoding apparatus is not limited thereto. For example, the image decoding apparatus may have the construction identical to that of the image decoding apparatus 100 of the first embodiment, and differs from the same only in that the CPU and the decoding unit decode the hierarchically coded signals.

In addition, although the CPU instructs the decoding unit to decode coded signals in accordance with priorities, the image decoding apparatus is not limited thereto. The CPU first decides that coded signals of first to n-th priority objects can be decoded within a given time and then instructs the decoding unit to decode the coded signals in an arbitrary order.

Further, the CPU may first decide decoding order of hierarchically coded signals comprising plural coded signals in accordance with the priority information extracted from the multiplexed signals, and then may instruct the decoding unit to decode only hierarchically coded signals between a lowest order hierarchy and a high-order hierarchy above a prescribed order, of the decoding order which is higher than a prescribed order.

Further, although in the image decoding apparatus of the fourth embodiment, priorities are assigned to hierarchically coded signals of all frames, the image decoding apparatus is not limited thereto. For example, in predictive decoding according to MPEG in which a frame is decoded by referring to an image signal of another frame, if decoding is skipped over plural frames, a reference image signal cannot be decoded. Therefore, in this predictive decoding, assuming that the coded signal to be decoded by referring to the undedcoded reference image signal remains undedcoded, a priority may not be assigned to the object. Furthermore, although in the fourth embodiment the coded signals are all first decoded and then synthesized, synthesizing may be performed concurrently with decoding.

Furthermore, also in the fourth embodiment, the various priority decision methods described in the first embodiment may be used in combination to decide priorities.

Furthermore, although in the fourth embodiment, the image decoding apparatus is used for receiving multiplexed signals in which coded signals of image data of respective objects have been multiplexed as input signals, they may be multiplexed signals comprising coded signals of digital data such as text data, design data (computer graphics (CG)data with which lines or graphics are drawn), and so forth, other than the image data. In case of text data, information such as font or character size are also transmitted, to be composited on a composite image as in the object images.

Furthermore, although in the fourth embodiment, an object is an image and a coded signals of image data is decoded, in a case where an object is sound such as voice or music, a coded signal of sound data can be decoded as described in the case of the image data of the fourth embodiment. In the case of sound, priorities are decided on the basis of amount of coded sound data, volume, or the like.

Embodiment 5.

A recording medium according to fifth embodiment of the present invention will now be described.

The recording medium of the fifth embodiment is used for recording the multiplexed signals output from the image multiplexing apparatus 400 of the second embodiment.

Figure 7:
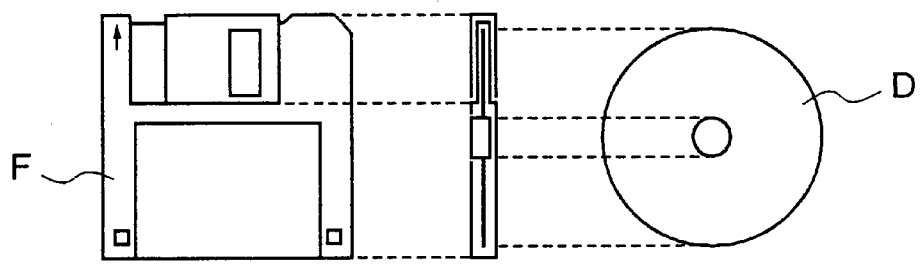
FIGS. 7(a) and 7(b) are diagrams showing a recording medium according to a fifth embodiment of the present invention.
FIG. 7(c) is a diagram showing a construction with which signal processing of the image decoding apparatus or image multiplexing apparatus of the first to fourth embodiments is implemented in a computer.
Figure 7:
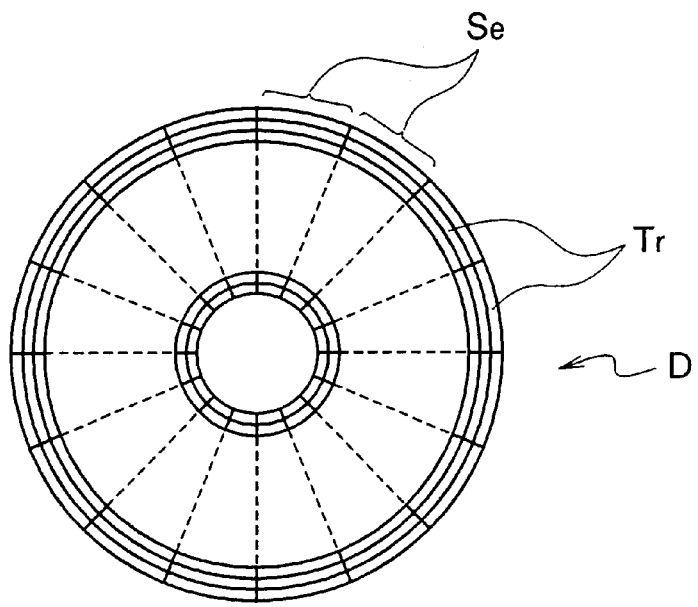
Figure 7:
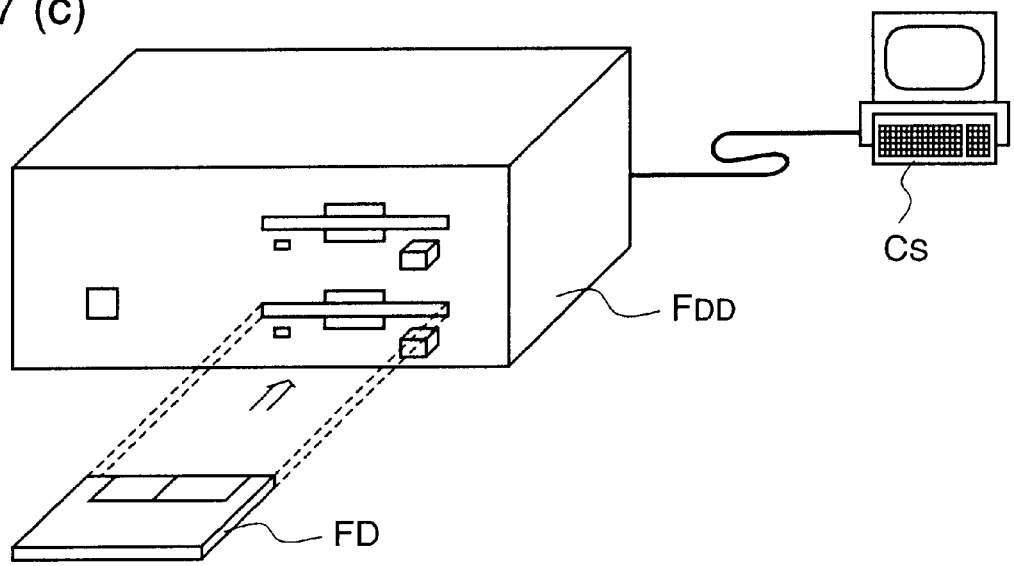
Figure 8:
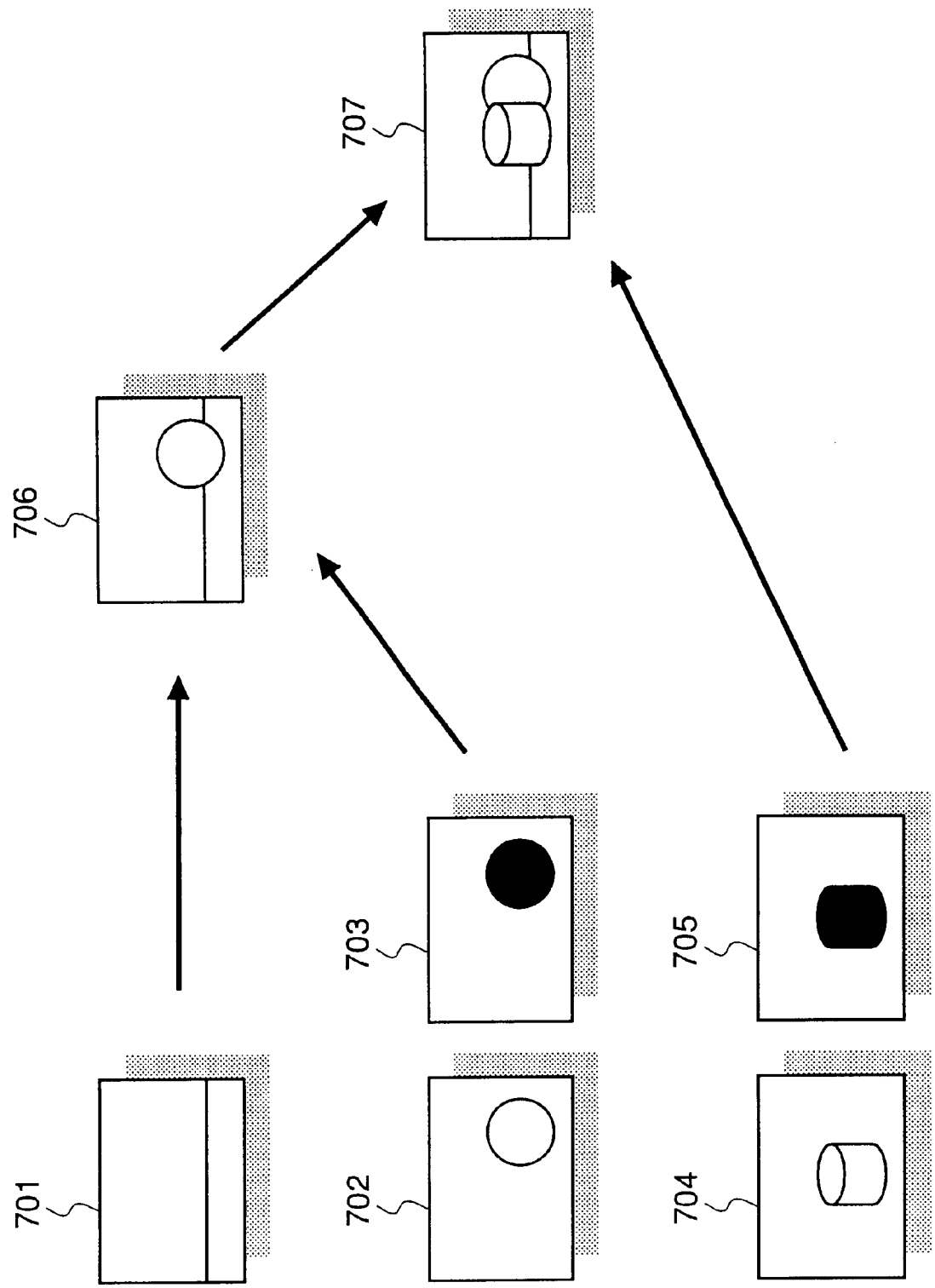
FIG. 8 is a conceptual view showing a composite image comprising images of plural objects.

FIGS. 7(*a*) and 7(*b*) are diagrams showing the recording medium, wherein FIG. 7(*a*) shows a front appearance and a cross-section of a floppy disc FD, and the floppy disc body D, and FIG. 7(*b*) shows a physical format of the floppy disc body D.

Referring to FIGS. 7(*a*) and 7(*b*), the floppy disc body D is stored in a case F, and in a surface thereof, plural tracks Trs are formed concentrically from outer to inner radius thereof, each track being divided into 16 sectors Se in an angle direction. Data (multiplexed signals) is recorded in an allocated area on the floppy disc body D.

The multiplexed signals recorded in the floppy disc FD can be decoded in the image decoding apparatuses of the third or fourth embodiment.

The floppy disc FD may record multiplexed signals comprising coded signals of digital data such as text data, design data, and so forth, as well as multiplexed signals in which coded signals of image data have been multiplexed.

Furthermore, a program for implementing constructions of the image decoding apparatus and the image multiplexing means described in the embodiments is recorded in the recording medium such as the floppy disc in FIG. 7(*a*), to carry out processing in the first to fourth embodiments in an independent computer system, with ease.

FIG. 7(*c*) is a diagram showing signal processing of the image decoding apparatus or the image multiplexing apparatus of the first to fourth embodiments in a computer using a floppy disc which stores a program for implementing the processing and shows a construction of recording and reproducing the program on the floppy disc FD. Referring to FIG. 7(*c*), in case of recording the program in the floppy disc FD, data of the program is written thereto through the floppy disc drive FDD from the computer system Cs. In another case of constructing the image transmission method and the image decoding apparatus in the computer system Cs by the program in the floppy disc FD, the program is read from the floppy disc FD through the floppy disc drive FDD and transferred to the computer system Cs.

Although signal processing in the computer system using the floppy disc as the recording medium is performed as described above, the recording medium is not limited thereto, and IC card, ROM cassette, or the like may be used so long as it can record data of a program, or the like.

What is claimed is:

1. A signal decoding method which decodes multiplexed signals obtained by multiplexing coded signals of plural pieces of respective information constituting a composed image, the multiplexed signals to be recorded or transmitted, comprising the steps of:

a priority order detecting step for obtaining priority information corresponding to the respective information from the multiplexed signals; and a decoding step for decoding the coded signals of the plural pieces of the respective information included in the multiplexed signals on the basis of the obtained priority information, wherein the decoding step includes a selecting step for selecting a predetermined number of the respective information in a composed image, the coded signals of the predetermined number of the respective information being decodable within a predetermined period by a decoding apparatus to which the multiplexed signals are input and which has a prescribed processing ability, according to the order of priorities indicated by the priority information, and a signal decoding step for decoding the coded signals corresponding to more than one piece of the respective information selected at the selecting step.

2. The signal decoding method as defined in claim 1, wherein the decoding step performs only a decoding process of the coded signals of the respective information selected by the selecting step among the plural pieces of the respective information constituting the composed image.

3. The signal decoding method as defined in claim 1, wherein the multiplexed signals are multiplexed signals obtained by multiplexing hierarchically coded signals comprising coded signals in plural hierarchies, each of the hierarchically coded signals corresponding to each of the plural pieces of respective information; and the decoding step is a step for performing a decoding process to only the hierarchically coded signals having a higher decoding order than a prescribed order, among the hierarchically coded signals corresponding to the plural pieces of the respective information included in the multiplexed signal, the decoding process being the process for decoding the coded signal corresponding to each of hierarchies between the lowest hierarchy and a higher hierarchy than a prescribed hierarchy.

4. The signal decoding method of claim 1, wherein the priority order detecting step;

detects amounts of the coded signal corresponding to each of the plural pieces of the respective information from the multiplexed signals, and decides the priority information for each of the plural pieces of the respective information such that the priority decreases in decreasing order of amounts of the corresponding coded signal.

5. The signal decoding method of claim 1, wherein the respective information to be recorded or transmitted comprises digital image data as digital data with which an image is displayed, and the multiplexed signals comprise a coded image signal in which the digital image data has been coded, as the coded signals.

6. The signal decoding method of claim 5, wherein the priority order detecting step detects size of regenerated images in which the coded image signals of the multiplexed signals have been decoded, on the basis of the coded image signals included in the multiplexed signals, and decides the priority information for each digital image data such that the priority of the digital image data decreases in decreasing order of size of the regenerated images.

7. The signal decoding method of claim 5, wherein the priority order detecting step detects overlapping order in which regenerated images in which the coded image signals of the multiplexed signals have been decoded are composed, on the basis of the coded image signals included in the multiplexed signals, and decides the priority information for each digital image data such that a higher priority is assigned to digital image data of a regenerated image located in front in relation to the other regenerated images, in a composite image comprising the overlapped regenerated images.

8. The signal decoding method of claim 5, wherein the priority order detecting step decides whether a regenerated image in which a coded image signal of the multiplexed signals has been decoded is used as a reference image for decoding another coded image signal or not, on the basis of the coded image signals included in the multiplexed signals, and decides the priority information for each digital image data such that a higher priority is assigned to digital image data of a regenerated image which is used as the reference image for the decoding, in relation to the other digital image data of regenerated images which are not used as the reference image for the decoding.

9. The signal decoding method of claim 5, wherein the priority order detecting step decides whether the coded image signal of each digital image data is an intra frame coded image signal or not, on the basis of the coded image signals included in the multiplexed signals, and decides the priority information for each digital image data such that a higher priority is assigned to digital image data of the intra frame coded image signal, in relation to the other digital image data in which coded image signals are not intra frame coded signals.

10. A signal decoding apparatus having a prescribed signal processing capacity which decodes multiplexed signals obtained by multiplexing coded signals of plural pieces of respective information constituting a composed image signal, the multiplexed signals to be recorded or transmitted, said apparatus comprising:

demultiplexing means for separating coded signals of the respective information from the multiplexed signals;

priority producing means for producing priority information corresponding to the respective information on the basis of the multiplexed signals;

decoding means for decoding the coded signals output from the demultiplexing means in a prescribed order in accordance with a control signal; and control means for controlling the decoding means by the control signal on the basis of the priority information of the respective information so that a predetermined number of the respective information in a composed image are selected, the coded signals of the predetermined number of the respective information being decodable within a predetermined period by a prescribed processing ability, according to the order of priorities indicated by the priority information, and the coded signals corresponding to more than one piece of the respective information selected are decoded.

11. A signal multiplexing method comprising the steps of:

coding plural pieces of respective information constituting a composed image to be recorded or transmitted to produce coded signals;

producing priority information corresponding to the respective information, which indicates the order of priorities in which coded signals of the respective information should be decoded, on the basis of the coded signals of the respective information; and producing a multiplexing signal by multiplexing the coded signals of the respective information together with the priority information of the respective information, wherein the priority information corresponding to each of the plural pieces of the respective information is decided such that the priority decreases in decreasing order of amounts of the corresponding coded signal.

12. A signal multiplexing method comprising the steps of:

coding plural pieces of respective information constituting a composed image to be recorded or transmitted, to produce coded signals;

producing priority information corresponding to the respective information, which indicates the order of priorities in which coded signals of the respective information should be decoded, on the basis of the coded signals of the respective information; and producing a multiplexing signal by multiplexing the coded signals of the respective information together with the priority information of the respective information, wherein the respective information to be recorded or transmitted comprises digital image data as digital data which is used for image display, the multiplexed signals comprise a coded image signal obtained by coding the digital image data, as the coded signals, and the priority information of each digital image data is decided on the basis of size of regenerated images in which coded image signals of the multiplexed signals have been decoded, and decided such that the priority of digital image data decreases in decreasing order of size of the regenerated images.

13. A signal multiplexing method comprising the steps of:

coding plural pieces of respective information constituting a composed image to be recorded or transmitted, to produce coded signals;

producing priority information corresponding to the respective information, which indicates the order of priorities in which coded signals of the respective information should be decoded, on the basis of the coded signals of the respective information; and producing a multiplexing signal by multiplexing the coded signals of the respective information together with the priority information of the respective information, wherein the respective information t o be r recorded or transmitted comprises digital image data as digital data which is used for an image display, the multiplexed signals comprise a coded image signal obtained by coding the digital image data, as the coded signals, and the priority information of each digital image data indicates the overlapping order in which regenerated images in which coded image signals of the multiplexed signals have been decoded are composed, and the priority information is decided such that a higher priority is assigned to digital image data of a regenerated image located in front in relation to the other regenerated images, in a composite image comprising the overlapped regenerated images.

14. A signal multiplexing method comprising the steps of:

coding plural pieces of respective information constituting a composed image to be recorded or transmitted, to produce coded signals;

producing priority information corresponding to the respective information, which indicates the order of priorities in which coded signals of the respective information should be decoded, on the basis of the coded signals of the respective information; and producing a multiplexing signal by multiplexing the coded signals of the respective information together with the priority information of the respective information, wherein the respective information to be recorded or transmitted comprises digital image data as digital data which is used for an image display, the multiplexed signals comprise a coded image signal obtained by coding the digital image data, as the coded signals, and the priority information of each digital image data is decided based on whether a regenerated image in which a coded image signal of the multiplexed signals has been decoded is used as a reference image for decoding another coded image signal or not, and decided such that a higher priority is assigned to digital image data of a regenerated image which is used as the reference image for or the decoding, in relation to the other regenerated images which are not used as the reference image for the decoding.

15. A signal multiplexing method comprising the steps of:

coding plural pieces of respective information constituting a composed image to be recorded or transmitted, to produce coded signals;

producing priority information corresponding to the respective information, which indicates the order of priorities in which coded signals of the respective information should be decoded, on the basis of the coded signals of the respective information; and producing a multiplexing signal by multiplexing the coded signals of the respective information together with the priority information of the respective information, wherein the respective information to be recorded or transmitted comprises digital image data as digital data which is used for an image display, the multiplexed signals comprise a coded image signal obtained by coding the digital image data, as the coded signals, and the priority information of the digital image data is decided based on whether a coded image signal of each digital image data of the multiplexed signals is an intra frame coded signal or not, and decided such that a higher priority is assigned to digital image data of the intra frame coded signal, in relation to the other digital image data in which coded image signals are not intra frame coded signals.

16. A signal multiplexing apparatus which multiplexes coded signals of plural pieces of respective information constituting a composed image to be recorded or transmitted, said apparatus comprising:

priority producing means for producing priority information corresponding to the respective information, which indicates the order of priorities in which coded signals of the respective information should be decoded, on the basis of the coded signals of the respective information; and multiplexing means for multiplexing the coded signals together with the priority information of the respective information, to output the multiplexed signal, wherein the priority information corresponding to each of the plural pieces of the respective information is decided such that the priority decreases in decreasing order of amounts of the corresponding coded signal.

17. A recording medium for storing multiplexed signals in which coded signals of plural pieces of respective information constituting a composed image, to be recorded or transmitted have been multiplexed together with priority information corresponding to the respective information used for deciding a decoding order of the coded signals, wherein the priority information indicates the order of priorities in which coded signals of the respective information should be decoded and is decided such that the priority decreases in decreasing order of amounts of the corresponding coded signal.

18. A recording medium for storing a program which makes a computer perform signal decoding, the program making the computer perform signal decoding by the signal decoding method of claim 1.

19. A recording medium for storing a program which makes a computer perform signal multiplexing, the program making the computer perform signal multiplexing by the signal multiplexing method of claim 11.

* * * * *

UNITED STATES PATENT AND TRADEMARK OFFICE
CERTIFICATE OF CORRECTION

PATENT NO.    : 6,414,972 B1
DATED         : July 2, 2002
INVENTOR(S)   : Makoto Hagai and Takeshi Hatakeyama It is certified that error appears in the above-identified patent and that said Letters Patent is hereby corrected as shown below:

Column 22,
Line 49, change "information t o be r recorded" to -- information to be recorded --.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,414,972 B1
DATED : July 2, 2002
INVENTOR(S) : Makoto Hagai and Takeshi Hatakeyama It is certified that error appears in the above-identified patent and that said Letters Patent is hereby corrected as shown below:

<u>Title page,</u>
Item [56], References Cited, U.S. PATENT DOCUMENTS, delete the following:
"5,751,445 A * 5/1998 Masunaga...358/426"

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,414,972 B1  Page 1 of 1
APPLICATION NO. : 09/025816
DATED : July 2, 2002
INVENTOR(S) : Makota Hagai and Takeshi Hatakeyama It is certified that error appears in the above-identified patent and that said Letters Patent is hereby corrected as shown below:

Column 2, On the title page: Item (56) References Cited, delete the citation of U.S. Patent
5,751,445 A * 5/1998 Masunaga….358/426 from the list of "U.S. PATENT DOCUMENTS."

Signed and Sealed this

Nineteenth Day of September, 2006

JON W. DUDAS
*Director of the United States Patent and Trademark Office*